J. A. Sabbaton,
Gas Meter,
N° 32,788. Patented July 9, 1861.
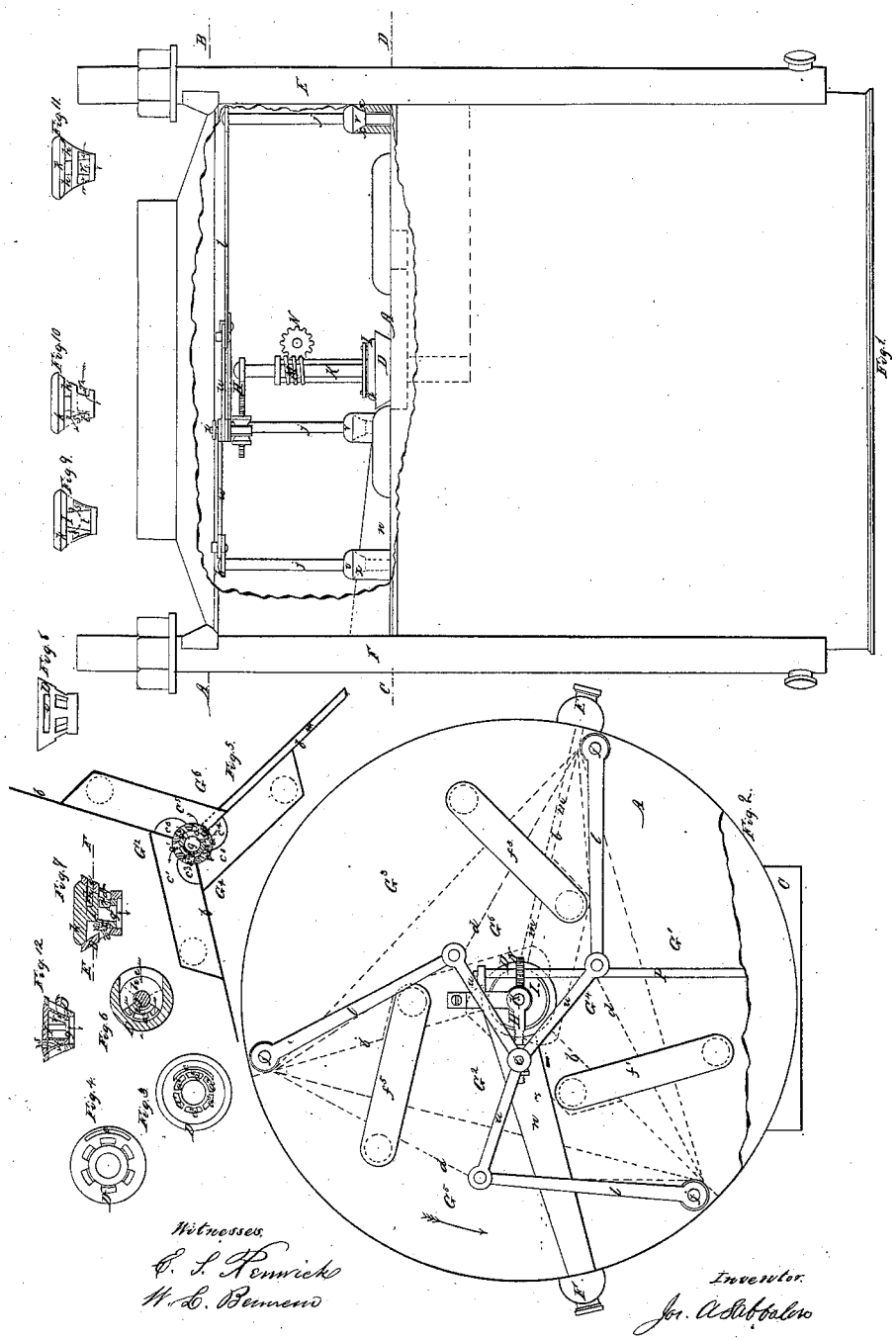

UNITED STATES PATENT OFFICE.

JOS. A. SABBATON, OF NEW YORK, N. Y.

DRY GAS-METER.

Specification of Letters Patent No. 32,788, dated July 9, 1861.

*To all whom it may concern:*

Be it known that I, JOSEPH A. SABBATON, of the city, county, and State of New York, have invented certain new and useful Improvements in Dry Gas-Meters, and that the following is a full, clear, and exact description of the same, reference being had to the accompanying drawing, in which—

Figure 1 represents an elevation of a three diaphragm meter with my improvements applied thereto, a portion of the case being removed to show the interior construction. Fig. 2 represents a plan of the meter with the portion of the case above A B of Fig. 1 removed; and Figs. 1, 2, 3, 4, 5, 6, 7, 8, 9, 10, and 11 represent various views of the valve and passages of the meter detached from the remainder thereof.

Dry gas meters have a series of measuring chambers closed by flexible diaphragms, and the gas is admitted into these chambers and is permitted to escape from them by means of valves operated by the flexible diaphragms. In the dry gas meters now in use, so far as my knowledge extends, the flexible diaphragms are combined with valves having flat surfaces and either sliding or turning upon flat valve seats which are fitted with ports that communicate with the variable chambers in which the gas is measured. Dry meters of this description, although accurate measurers of the consumption of gas when new, are speedily affected by the accumulation upon the sliding surfaces of the valves of matter deposited by the gas, and this matter, intervening between the surface of the valve and the surface of the seat on which it moves, causes the valve to rise from its seat and permit the passage of gas through the meter without measurement.

The object of the first part of my invention is to obviate this defect, and it consists in the combination of the series of flexible diaphragms of a dry gas meter with a turning conical valve fitted with an inlet passage at one of its heads, with an outlet passage at its opposite head, with two lateral ports communicating respectively with the inlet and outlet passages, and turning in a conical seat fitted with as many ports as there are variable measuring chambers in the meter. The form of cone for the valve which I prefer is one constructed upon the principle of Schiele's antifriction curve, as it is an advantage to reduce the power required to move the valve to the smallest attainable quantity.

The object of the second part of my invention is to obviate the use of a stuffing box between the valve and the register or index of the meter. In dry gas meters now generally in use the gas is admitted into a chamber above the variable measuring chamber, which upper chamber is commonly called the gallery and contains the mechanism for operating the valves and for communicating motion to the register. In order to prevent the escape of gas from the gallery to the register, the latter is placed in a separate chamber and the shaft which communicates motion to the register is passed through a stuffing box. A stuffing box in such a position is liable to leak and permit the escape of gas, moreover the friction caused by the pressure of its packing upon the shaft that communicates motion to the register adds materially to the power required to operate the meter. The second part of my invention excludes the gas from the gallery of the meter and obviates the necessity of a stuffing box, and it consists in the combination of the valve and valve seat before mentioned with an inclosed inlet passage (that has no communication with the gallery) by means of a supplementary port in the valve seat and a supplementary passage in the head of valve.

The object of the third part of my invention is to obviate the necessity of using stuffing boxes upon the stems of the diaphragms which impart motion to the valves of the meter; and it consists in combining the stems of the diaphragms with conical stoppers fitted by grinding into conical seats, thus obviating the employment of any packing between the surfaces of the metal; and the form of conical stopper and seat which I prefer for this purpose is that constructed upon the principle of Schiele's antifriction curve.

My invention is applicable to dry gas meters having two or more diaphragms but I prefer to construct the meter with three diaphragms.

The first part of my invention may be used without the second or third parts thereof; the second part thereof may be used without the third part; and the third part may be used without the first and second; but I believe the best effect will be attained by using all parts of my invention in the same meter, and the meter represented in the accompanying drawing embodies them all. This meter is divided into two main divisions by a horizontal partition A. The body of the meter below this partition is divided into three compartments by three radiating partitions $b, b, b$, (shown in dotted lines in Fig. 2); and each of these compartments is subdivided into two measuring chambers by a flexible diaphragm (shown in dotted lines at $d, d, d,$ Fig. 2). There are thus three flexible diaphragms and six measuring chambers in the meter, and as the construction and arrangement of these are the same as those of three diaphragm meters in common use, it is not deemed necessary to describe them in detail.

The portion of the meter above the horizontal partition A is commonly called the gallery, and contains the mechanism for imparting motion to the valve and to the indices of the register, whose dial faces are located in a rectangular box, C, secured to the side of the meter, and are covered with a glass plate. The inner edges of the three radiating partitions of the measuring chambers abut against a vertical tube, at the upper end of which the conical valve seat D is secured. This tube receives the gas from the outlet passage at the lower head of the valve, and it is connected by means of a thin horizontal passage $m$ with the outlet pipe E at the side of the meter, so that the gas passing from the valve at the center of the meter is discharged at the side thereof.

The valve seat D has the form of a hollow cone generated by the revolution of Schiele's antifriction curve around a central axis, and has six ports $a^1, a^2, a^3, a^4, a^5, a^6$, in its periphery, corresponding with the six measuring chambers; moreover as this meter embodies the second part of my invention, the valve seat has a supplementary port $e$ in its periphery that is connected by an inclosed inlet passage $n$ with the inlet pipe F at the side of the meter. The conical valve seat receives the conical valve I, which is ground to fit it and has an inlet passage $s$ at its upper head, an outlet passage $g$ at its lower head to discharge the gas into the central tube beneath, a lateral inlet port $t$ at one side communicating with the inlet passage $s$, and a lateral outlet port $r$ (at the opposite side to the inlet port) communicating with the outlet passage $g$; moreover it is fitted with a supplementary passage $h$, in the form of a ring, which is in free communication with the supplementary port $e$ in whatever position the valve may be. As this supplementary passage in the valve is surmounted by the disk cap $k$, whose edges are ground to fit the valve seat, the escape of gas upward into the gallery of the meter is effectually prevented. Each of the six ports $a^1, a^2, a^3, a^4, a^5, a^6$, in the valve seat is connected with an independent passage leading to a separate variable chamber, the three passages $c^2, c^4, c^6$, communicating directly with the adjacent variable chambers (beneath the letters $G^2$ $G^4$ $G^6$ on the inner side of the flexible diaphragms); the three passages $c^1$ $c^3$ $c^5$ communicating with the variable chambers (beneath the letters $G^1, G^3, G^5,$) on the outer sides of the flexible diaphragms through the intervention of three skewed passages $f^1, f^3, f^5$, and the breadth of the outlet and inlet ports of the valve I is as great as that of two adjacent ports in the valve seat, so that while three of the chambers communicate through their respective ports ($a^1, a^2, a^3,$) and passages with the inlet port of the valve (as shown at Fig. 5) and are filling, the remaining three communicate through their respective ports ($a^4$ $a^5$ $a^6$) and passages with the outlet port of the valve, and are discharging. The change of the position of the valve, so as to change each chamber in rotation from a filling to a discharging chamber, is effected by turning the valve in its seat, and this is effected by the movement of the flexible diaphragms. To this end each diaphragm is fitted with a stem $j$ which passes upward into the gallery of the meter. The upper end of each stem has an arm $l$ secured to it, and each arm is connected by a rod $u$ with the pin of a crank H, which is secured to the upper end of the stem K of the valve I. Hence as the chambers fill, the movement of the diaphragms imparts a rotary motion to the valve in the direction of the arrow in Fig. 2, carrying its outlet and inlet ports in succession past the ports of the variable chambers, so that each chamber in its proper order is brought into communication with the outlet and inlet pipe of the meter. In order to regulate the working capacity of the chambers the crank pin $i$ is fitted to slide upon the crank, so that the stroke of the diaphragms can be adjusted; and the crank pin is secured in the proper position by screw nuts.

Motion is imparted to the indices of the register from the valve stem K, so that the indices shall register the amount of gas passed through the meter by each filling and discharge of the measuring chambers. To this end the valve stem K is fitted with a worm M, which engages with the teeth of a worm wheel N, secured to a shaft P, that connects with the train of wheels of the register. The register is constructed in the usual manner to indicate by the positions of its indices upon their dials the number of cubic feet of gas passed through the meter.

The stem —$j$— of each flexible diaphragm passes upward into the gallery through a short tube and has a conical stopper $v$ secured to it, which is ground to fit into a hollow conical seat $x$ at the upper extremity of the short tube. The stopper and its seat are formed as represented, upon the principle of Schiele's antifriction curve, so as to wear equably and generate but little friction by the movement of the one on the other.

A dry gas meter constructed as above described operates with an exceedingly small amount of friction, the amount being found by experiment to be so small that a considerable weight can be placed upon the conical valve to press it into its seat and upon the conical stoppers of the stems of the diaphragms without materially affecting the pressure of the gas at the outlet pipe. Experiments of one of these meters operated in connection with a standard fluid meter have demonstrated that it is an accurate measurer of gas, and it is found that the valve is not caused to leak by the deposit of matter between its surface and that of its seat.

When the first part of my invention is to be used without the second part thereof, the inclosed inlet passage ($n$) is omitted, together with the supplementary inlet port ($e$) in the valve seat, the supplementary passage ($h$) and the cap $k$ of the valve. The valve and seat then have the form shown at Fig. 12, where the parts denoted by letters correspond with those denoted by the same letters in Fig. 7.

Having thus described a dry gas meter embodying all my improvements, what I claim as my invention and desire to secure by Letters Patent is—

1. The combination of a series of flexible diaphragms with a conical valve having an inlet passage at one of its heads, an outlet passage at its other head, two lateral ports communicating respectively with the inlet and outlet passages, and turning in a conical valve seat fitted with as many ports as there are chambers in the meter; the whole constructed arranged and operating substantially as described.

2. The combination of the said valve and valve seat with an inclosed inlet passage, a supplementary port in the valve seat, and a supplementary passage in the valve, substantially as described.

3. The combination of the stems of the flexible diaphragms with conical stoppers and stopper-seats, substantially as described.

In testimony whereof I have hereunto subscribed my name.

JOS. A. SABBATON.

Witnesses:
W. L. BENNEM,
E. S. RENWICK.